(12) United States Patent
Erta et al.

(10) Patent No.: US 11,575,612 B2
(45) Date of Patent: Feb. 7, 2023

(54) REDUCING PACKET MISORDERINGS IN WIRELESS NETWORKS

(71) Applicant: Cisco Technology, Inc., San Jose, CA (US)

(72) Inventors: Alessandro Erta, Licciana Nardi (IT); Luca Bisti, Grosseto (IT); Domenico Ficara, Essertines-sur-Yverdon (CH); Kasi Nalamalapu, Cupertino, CA (US); Vincent Cuissard, Eteaux (FR); Sudhir Kumar Jain, Fremont, CA (US); Loris Gazzarrini, Lausanne (CH); Arun Khanna, Sunnyvale, CA (US); Stefano Ferrari, Le mont sur Lausanne (CH); Salvatore Valenza, Pomy (CH)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 17/340,606

(22) Filed: Jun. 7, 2021

(65) Prior Publication Data

US 2022/0393988 A1    Dec. 8, 2022

(51) Int. Cl.
*H04L 47/28*    (2022.01)
*H04W 40/20*    (2009.01)
*H04L 47/50*    (2022.01)
*H04W 8/04*    (2009.01)

(52) U.S. Cl.
CPC .............. *H04L 47/28* (2013.01); *H04L 47/50* (2013.01); *H04W 8/04* (2013.01); *H04W 40/20* (2013.01)

(58) Field of Classification Search
CPC .......... H04L 47/28; H04L 47/50; H04W 8/04; H04W 40/20
See application file for complete search history.

(56) References Cited

U.S. PATENT DOCUMENTS

| | | | |
|---|---|---|---|
| 8,644,256 B2 * | 2/2014 | Nikander | H04W 36/0016 455/442 |
| 8,824,477 B2 | 9/2014 | Schrum, Jr. et al. | |
| 9,253,123 B1 * | 2/2016 | Podge | H04L 45/66 |
| 9,985,903 B2 | 5/2018 | Shalev et al. | |
| 10,321,365 B2 | 6/2019 | Taneja et al. | |
| 10,764,189 B1 * | 9/2020 | Rivaud | H04L 45/02 |
| 10,917,341 B2 | 2/2021 | Shen et al. | |
| 11,063,639 B1 * | 7/2021 | Legg | H04B 7/086 |
| 2006/0193272 A1 | 8/2006 | Chou et al. | |
| 2013/0176989 A1 * | 7/2013 | O'Neill | H04W 36/18 370/331 |
| 2017/0230298 A1 * | 8/2017 | Perry | H04L 41/0896 |
| 2019/0058663 A1 * | 2/2019 | Song | H04L 47/26 |
| 2019/0327174 A1 * | 10/2019 | LaVigne | H04L 47/25 |
| 2019/0363989 A1 | 11/2019 | Shalev et al. | |

(Continued)

*Primary Examiner* — Chi H Pham
*Assistant Examiner* — Weibin Huang
(74) *Attorney, Agent, or Firm* — Behmke Innovation Group LLC; Kenneth J. Heywood; Jonathon P. Western

(57) ABSTRACT

In one embodiment, a networking device receives packets of a traffic flow destined for a mobile system. The networking device sends a first flowlet of the traffic flow towards the mobile system via a first wireless access point. The networking device determines an idle time between the first flowlet and a second flowlet of the traffic flow. The networking device sends, based on the idle time, the second flowlet towards the mobile system via a second wireless access point.

18 Claims, 12 Drawing Sheets

(56) References Cited

U.S. PATENT DOCUMENTS

2019/0387435 A1* 12/2019 Cariou .................. H04W 28/10
2020/0403923 A1    12/2020 Attar et al.
2021/0084558 A1*  3/2021 Speicher ............... H04W 48/20

* cited by examiner

REDUCING PACKET MISORDERINGS IN WIRELESS NETWORKS

TECHNICAL FIELD

The present disclosure relates generally to computer networks, and, more particularly, to reducing packet misorderings in wireless networks.

BACKGROUND

Cellular network coverage has made Internet connectivity increasingly ubiquitous. This has led to an ever-increasing demand for bandwidth, to accommodate traffic such as multimedia content and communications (e.g., bandwidth-intensive high definition video streaming or real time video calls, etc.). For instance, passengers of public transportation now expect on-board, high-speed connectivity, which implies a reliable wireless ground-to-vehicle communication.

In general, mobile wireless backhauling is challenging, particularly in cases of fast-moving mobile systems, such as trains, busses, mine carts, trucks, cranes, and the like. These vehicles have to provide connectivity to onboard wired and/or wireless devices without any interruptions. Cellular technologies, such as Long-Term Evolution (LTE), are typically not practical for such scenarios, so backhauling is performed by Wi-Fi between mobile nodes (e.g., on a train) and distributed nodes along the path (e.g., trackside nodes along the rails). However, the dynamic nature of the network, as well as the environmental radio frequency (RF) conditions, may lead to packet losses, reduced throughput, and other such conditions.

Make-before-break roaming can help to allow a mobile node to smoothly transition from one access point to another without a loss of connectivity, by ensuring that a new connection between the mobile node and a new access point is established before breaking its older connection. While this approach can help to avoid interruptions in the communications for the mobile node, this approach can also lead to packets sent to the mobile node becoming misordered. Even if the mobile node is able to correct the ordering of the packets, this extra operation can impinge on any deterministic or low latency requirements of the traffic.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
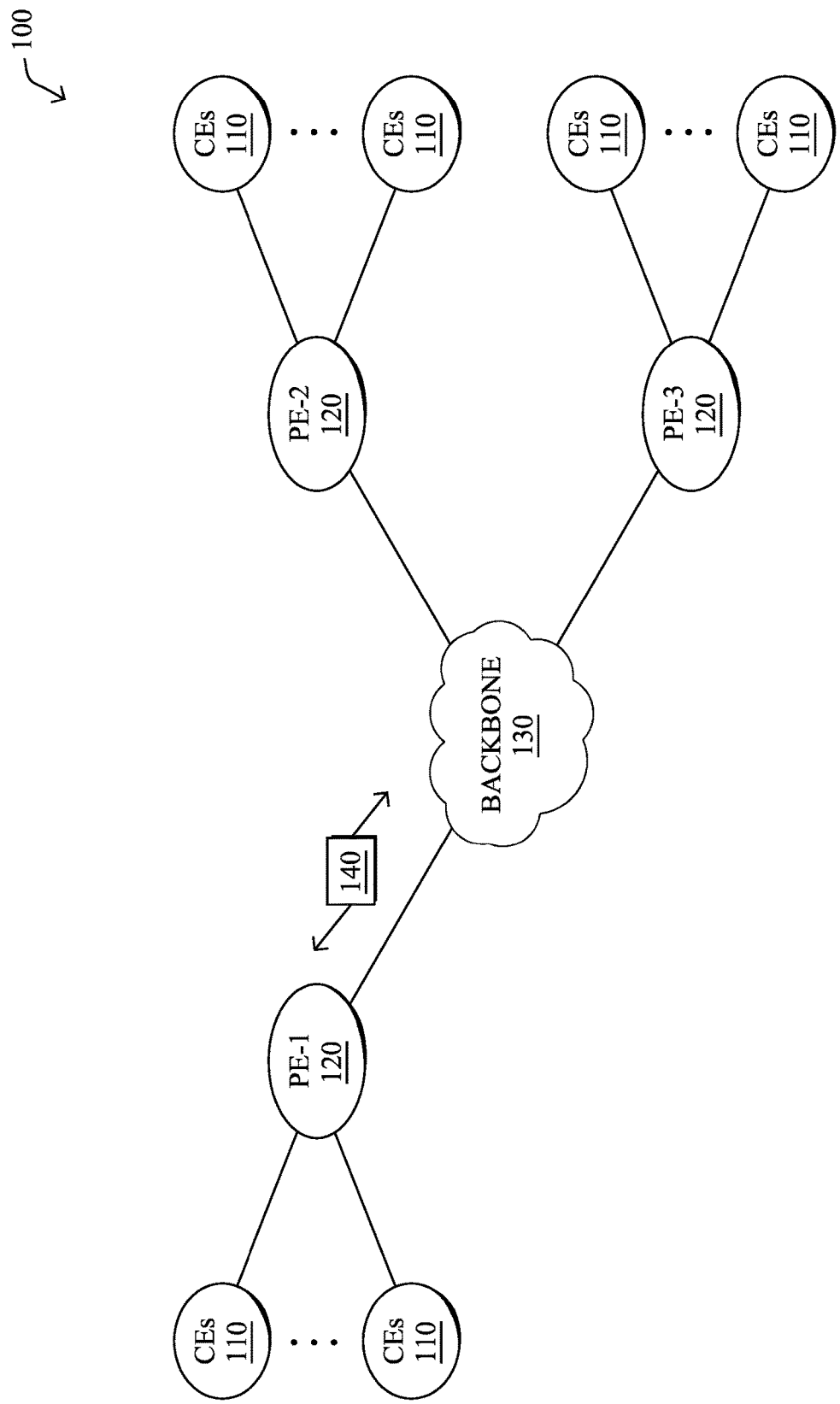
FIGS. 1A-1B illustrate an example communication network.

According to one or more embodiments of the disclosure, a networking device receives packets of a traffic flow destined for a mobile system. The networking device sends a first flowlet of the traffic flow towards the mobile system via a first wireless access point. The networking device determines an idle time between the first flowlet and a second flowlet of the traffic flow. The networking device sends, based on the idle time, the second flowlet towards the mobile system via a second wireless access point.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
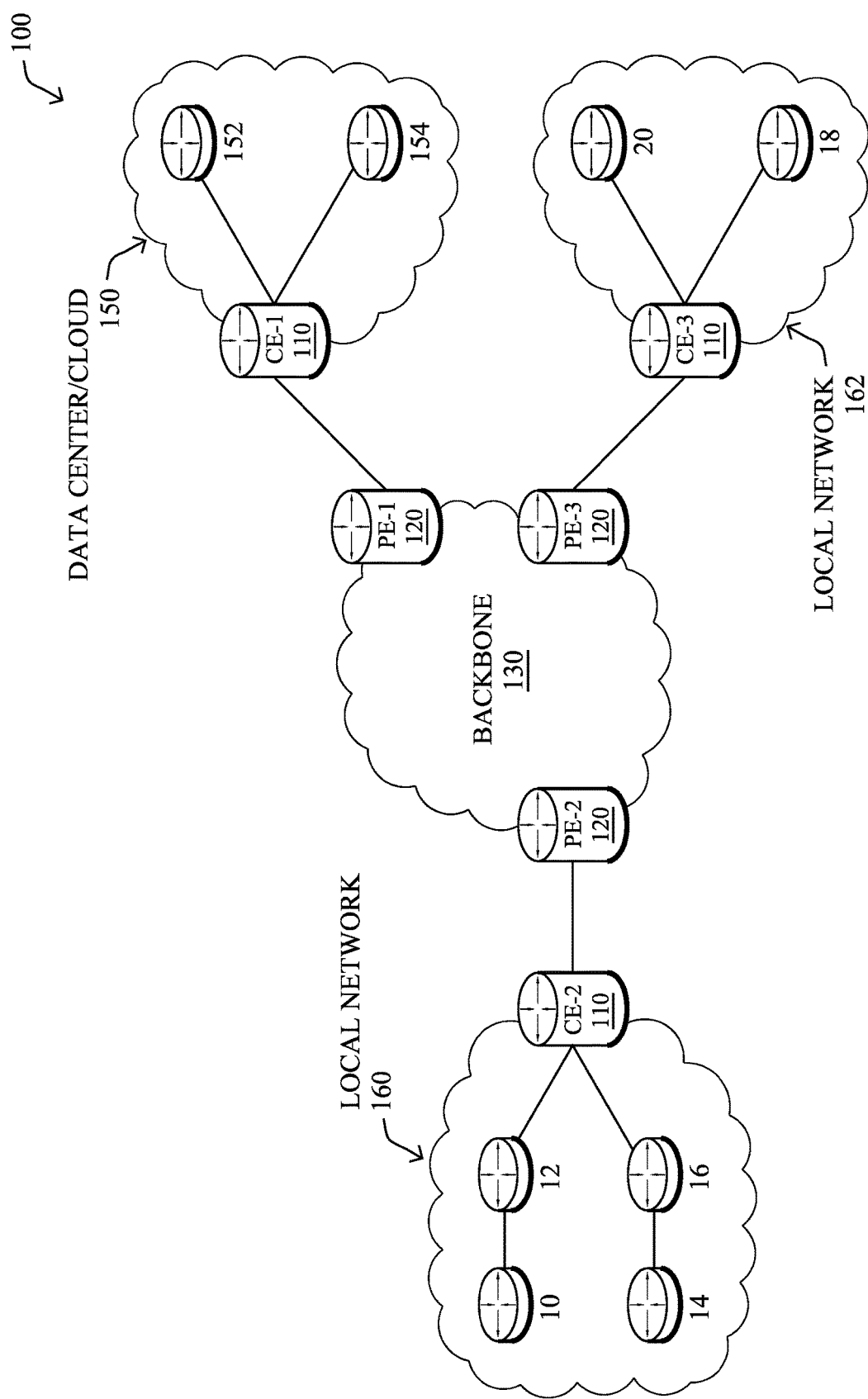

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
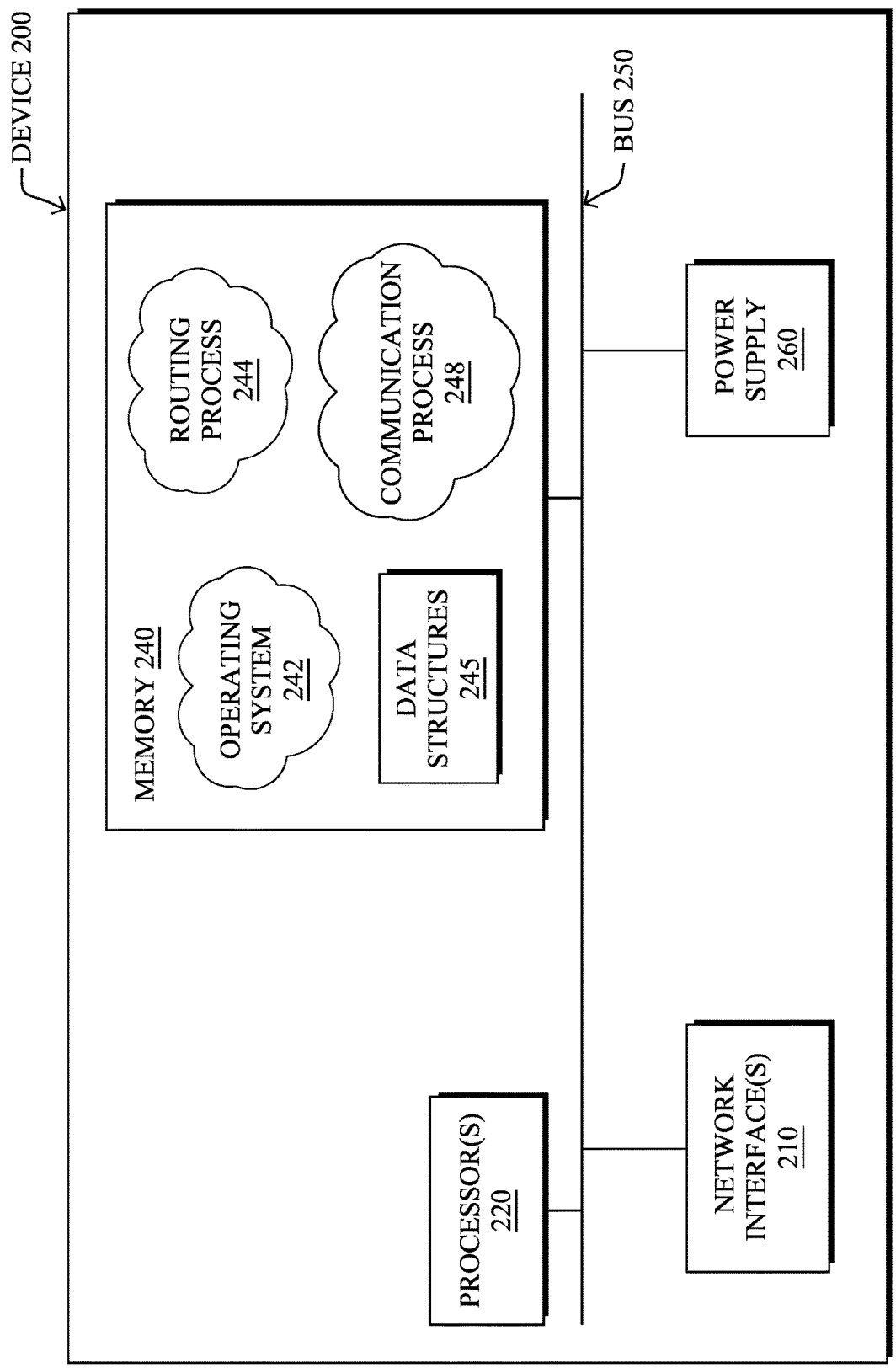
FIG. 2 illustrates an example network device/node.

FIG. 2 is a schematic block diagram of an example node/device 200 that may be used with one or more embodiments described herein. As shown, device 200 may comprise one or more communication interfaces 210 (e.g., wired, wireless, etc.), at least one processor 220, and a memory 240 interconnected by a system bus 250, as well as a power supply 260 (e.g., battery, plug-in, etc.).

Communication interface(s) 210 include the mechanical, electrical, and signaling circuitry for communicating data over a communication link. To this end, communication interface(s) 210 may be configured to transmit and/or receive data using a variety of different communication protocols, such as TCP/IP, UDP, Ethernet, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, inter alia, invoking network operations in support of software processors and/or services executing on the device. These software processors and/or services may comprise a routing process 244 and/or a communication process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process 244 includes instructions executable by processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In general, communication process 248 includes instructions executable by processor 220 to perform functions related to a mobile system roaming from one wireless access point to another. To this end, communication process 248 may operate in conjunction with routing process 244, in some instances, to establish and maintain one or more LSPs between a mobile system and the backend infrastructure. An example protocol that uses label-switched paths is the Multiprotocol Label Switching (MPLS) protocol. In general, MPLS operates by appending an MPLS header to a packet that includes a label 'stack.' The label(s) in the stack are inserted by a label edge router (LER) based on the forwarding equivalence class (FEC) of the packet. Paths are also managed via the Label Distribution Protocol (LDP) or Resource Reservation Protocol-Traffic Engineering (RSVP-TE).

In various embodiments, as detailed further below, communication process 248 may also include computer executable instructions that, when executed by processor(s) 220, cause device 200 to perform the techniques described herein with respect to preventing the use of a specific base station of a wireless network. To do so, in some embodiments, communication process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, communication process 248 may employ one or more supervised, unsupervised, or semi-supervised machine learning models. Generally, supervised learning entails the use of a training set of data, as noted above, that is used to train the model to apply labels to the input data. For example, the training data may include sample location data and performance metrics that have been labeled as acceptable or not acceptable. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that communication process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

Figure 3A:
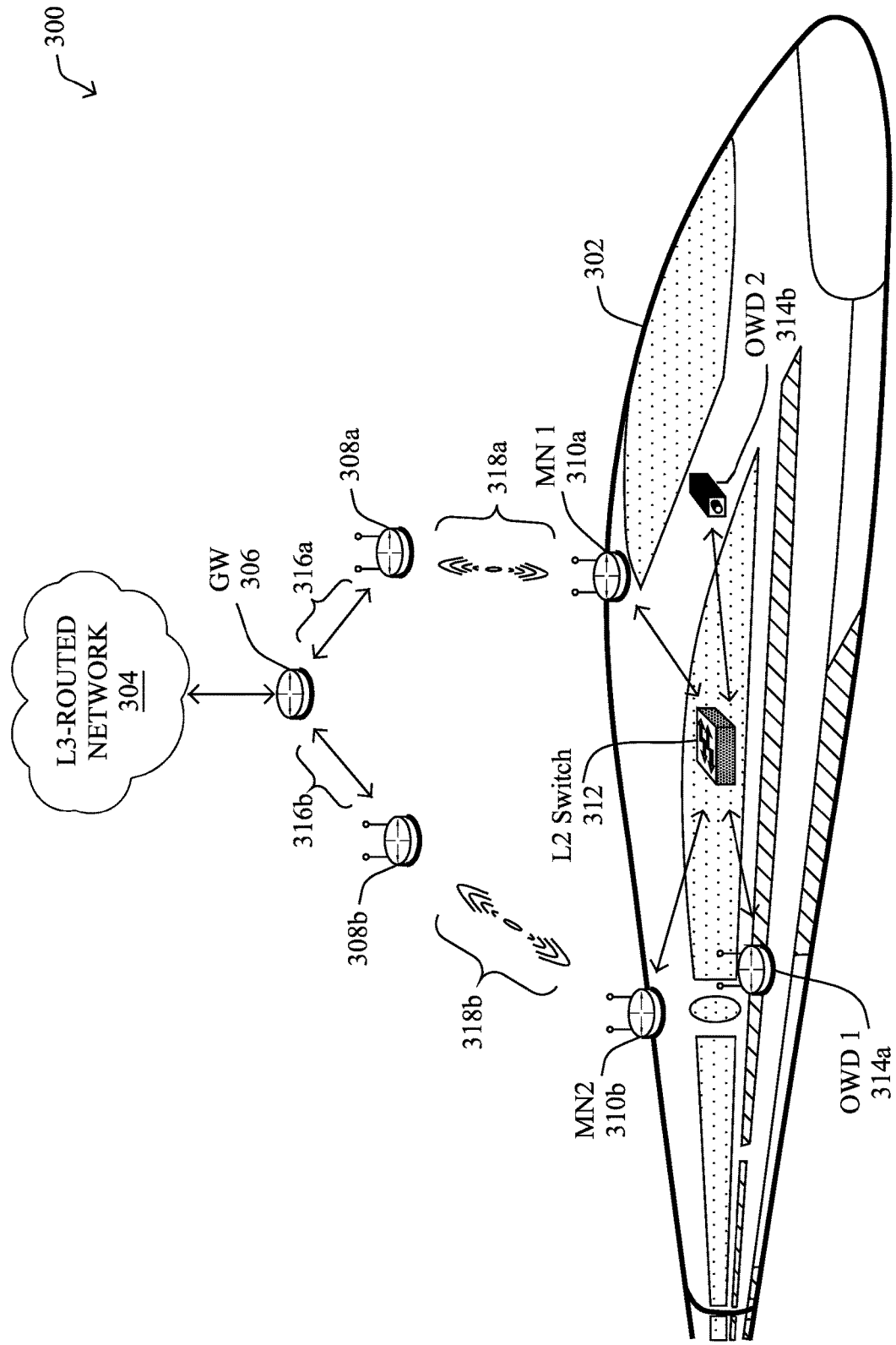
FIGS. 3A-3B illustrate examples of a mobile system communicating wirelessly.

FIG. 3A illustrates an example 300 of a mobile system communicating wirelessly, according to various embodiments. As shown, the mobile system 302 may generally take the form of any mobile object or set of objects equipped with its own internal network and configured to communicate wirelessly with a backhauling system during motion. For instance, mobile system 302 may take the form of a train, bus, airplane or other flying vehicle, ferry, automobile, mine cart, crane, truck, another form of vehicle that may be used for transportation or shipping, a vehicle that may be found in a worksite, mining location, industrial site, factory, etc., a robot, or the like. In further cases, mobile system 302 may be a fully-autonomous, or partially-autonomous, vehicle or other system that moves with little or no direct human control.

Onboard mobile system 302 may be various networking devices that support the mobile domain of mobile system 302. In some embodiments, as shown, there may be a Layer-2 (L2) switch 312 onboard mobile system 302 that is connected to any number of onboard devices 314 within the mobile domain of mobile system 302. For instance, onboard device 314a may take the form of an onboard Wi-Fi access point that provides connectivity to any number of user devices (e.g., mobile phones, computers, etc.) of passengers being transported by mobile system 302. Conversely, onboard device 314b may take the form of a security camera that is also connected to L2 switch 312. In various embodiments, some or all of the onboard devices 314 may be onboard wired devices (OWDs), meaning that they communicate with L2 switch 312 via wired connections, such as an Ethernet network or the like.

According to various embodiments, the mobile domain of mobile system 302 may also include a plurality of mobile nodes 310, denoted "MN" in the Figures for simplicity. For instance, as shown, mobile system 302 may include a first MN 310a and a second MN 310b. Each MN 310 may generally include: 1.) a wireless interface to exchange data with wireless access points of the backhaul network and 2.) a local interface to exchange data with the local network of mobile system 302. For instance, MN 310a and MN 310b may each have a wired connection to L2 switch 312.

As would be appreciated, MN 310a and MN 310b may be located on mobile system 302 at a distance from one another, so as to provide spatial diversity to the potential wireless connection points utilized by mobile system 302. For example, MN 310a may be located near the front of mobile system 302 (e.g., the head-end of a train), while MN 310b may be located farther towards the rear of mobile system 302 than that of MN 310a. Thus, even if a particular MN 310 does not have a reliable wireless connection to the backhaul system, another MN 310 of mobile system 302 may (e.g., if the train is going around a curve in the track, etc.). In some instances, MNs 310 may also offer frequency diversity, as well, such as by operating on different frequencies, at least part of the time. As a result, even if one frequency is experiencing interference, the other frequency could be used to form a wireless connection between mobile system 302 and the backhaul system.

Located along the path of travel of mobile system 302 (e.g., a railroad track, a road, a waterway, a runway, etc.) may be any number of wireless access points/base stations 308. For instance, as shown, there may be trackside access points (APs)/base stations 308a-308b shown. Note that while these wireless access points are referred to herein as 'trackside,' their locations can be varied depending on the deployment scenario (e.g., roadside, etc.).

During operation, base stations 308a-308b may form wireless connections with MN 310a and/or MN 310b, to provide wireless connectivity to mobile system 302 as it travels. To this end, each base station 308 may include at least 1.) a wireless interface to communicate with a MN 310 and 2.) an interface to communicate with a gateway, denoted "GW" 306 in the Figures for simplicity. Typically, the connections between base stations 308a-308b and GW 306 are wired connections that use a suitable wired communication protocol, such as Ethernet.

GW 306 represents the other end of the backhauling system and provides Layer-3 (L3) routing functions. To do so, GW 306 may include at least one interface connected to L3-routed network 304, as well as any number of interfaces to communicate with base stations 308. For instance, L3-routed network 304 may take the form of the Internet, in many instances, although the techniques herein may be extended to any number of different types of external networks, as desired.

Traditionally, a backhaul system supporting mobile domains/systems relies on the use of multiple tunnels, to convey traffic between the L3 gateway and the mobile domain/system. For instance, as shown, assume that MN 310a has formed a wireless connection 318a with base station 308a. Such a connection may be formed using a suitable transmission protocol, such as the Prodigy protocol by Fluidmesh (now Cisco Systems) or another wireless protocol that supports extremely fast handoffs. Consequently, MN 310a may establish a first tunnel over wireless connection 318a. GW 306 and base station 308a may form a second tunnel via their connection 316a, likewise. Thus, when base station 308a sends traffic that it receives from MN 310a towards GW 306, it may encapsulate the traffic and tunneled via the first tunnel, which base station 308a then encapsulates for transport via the second tunnel to GW 306. A similar approach may be taken with respect to wireless connection 318b between MN 310b and base station 308b, as well as connection 316b between base station 308b and GW 306.

In alternative embodiments, a single L2 tunnel may be established between each base station 308 and GW 306. This tunnel will carry L2 traffic between GW 306 and the MN 310 to which the base station 308 is connected. For instance, a first L2 tunnel may be formed between GW 306 and base station 308a over which traffic conveyed between base station 308a and MN 310a may be transported, assuming that wireless connection 318a exists. Similarly, another GW 306 and base station 308b may form a second L2 tunnel over which traffic conveyed between base station 308b and MN 310b may be transported, assuming that wireless connection 318a exists.

Typically, only a single wireless link is active at any given time between a mobile system, such as mobile system 302, and any given base station 308. For instance, assume that MN 310a is wirelessly connected to base station 308a. In such a case, any other MN 310 on mobile system 302 (e.g., MN 310b, etc.) may be in an idle state at that time. In other words, one of the mobile nodes (e.g., MN 310a) may be designated as the primary, while the other is designated as the secondary (e.g., MN 310b) and remains idle. As mobile system 302 roams, the primary node may begin passing its traffic to the secondary node, to begin leveraging its own connection to the fixed infrastructure. In turn, the roles of the two nodes may be switched, thereby making MN 310a the secondary node and MN 310b the primary node.

As noted above, make-before-break roaming can help to allow a mobile node to smoothly transition from one access point to another without a loss of connectivity, by ensuring that a new connection between the mobile node and a new access point is established before breaking its older connection. For instance, MN 310a may maintain its association with base station 308b until it has fully established an association with base station 308a. While this approach can help to avoid interruptions in the communications for the mobile node, this approach can also lead to packets sent to the mobile node becoming misordered. Even if the mobile node is able to correct the ordering of the packets, this extra operation can impinge on any deterministic or low latency requirements of the traffic.

Figure 3B:
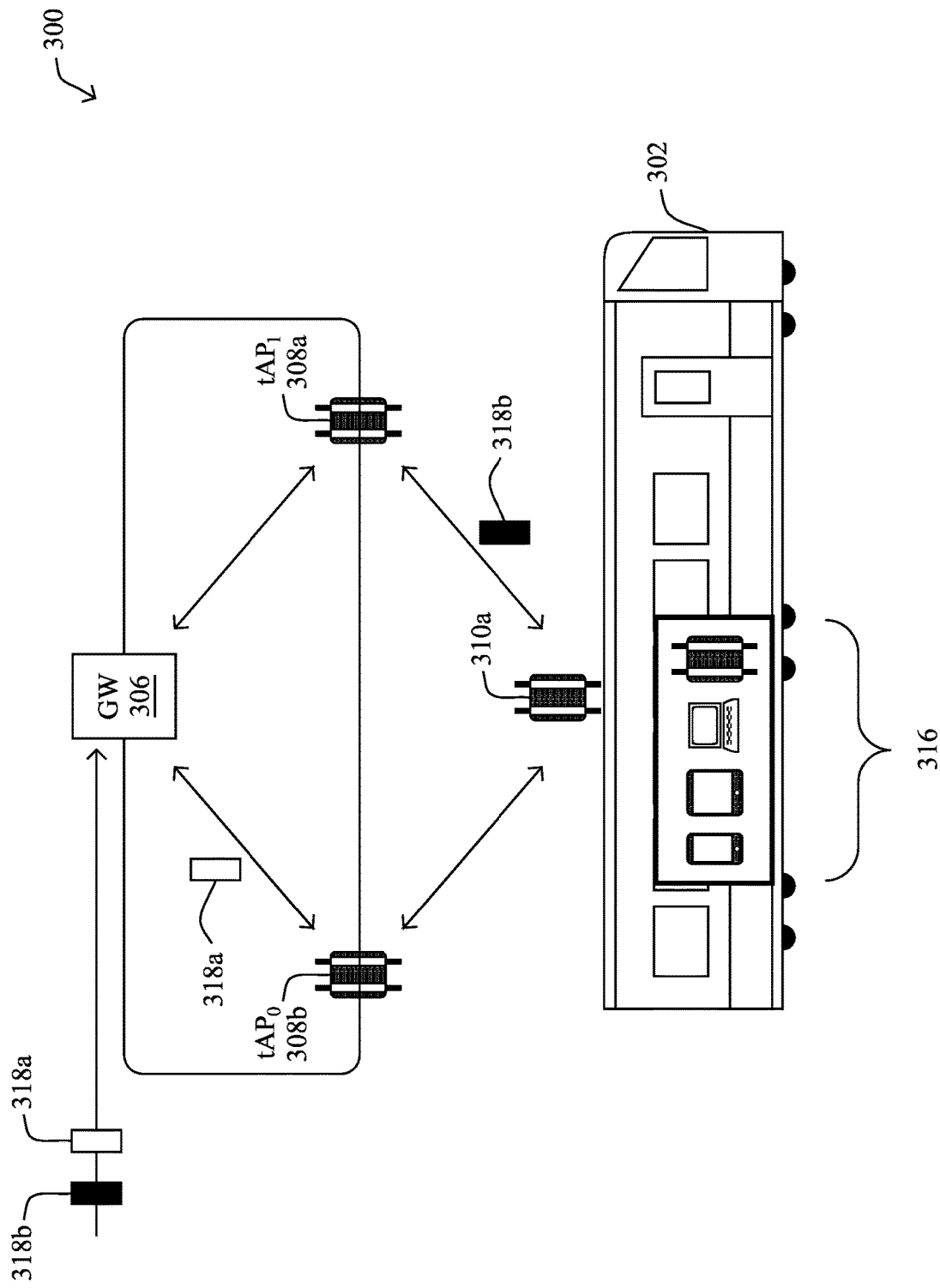

More specifically, until the mobile node has fully switched over to its new connection, some traffic may remain in intermediate queues going through the former path to reach the mobile node (via its prior access point). This scenario is illustrated in FIG. 3B. For instance, assume that there are packets 318a-318b that are destined for mobile system 302, so that they can be delivered to any of the devices 316 onboard mobile system 302. As mobile system 302 begins its transition from base station 308b to base station 308a, packet 318a may be sent along the old path via base station 308b. However, the subsequent packet 318b may be sent towards mobile system 302 over the new path via base station 308a. If the queues are too full along the former path, though, mobile system 302 may receive wireless connection 318b via its new connection with base station 308a before receiving the older packet 318a sent via base station 308b. This potentially imposes an extra computational step by mobile system 302, whenever it roams, to correct the ordering of the packets, prior to delivering them to their final destinations (e.g., devices 316).

Reducing Packet Misorderings in Wireless Networks

The techniques introduced herein help to mitigate, or even eliminate, packet misorderings that can occur during certain roaming handoffs in wireless networks. In some aspects, the identification of flowlets can be leveraged to time the switchover of the traffic to a mobile system. In further aspects, queueing at the base station/access point can also be used, to help ensure that packets are received in order. In an additional aspect, media access control (MAC) adaptation can be used to change the operational states of the access points, to ensure the receipt of the packets in order.

Illustratively, the techniques described herein may be performed by hardware, software, and/or firmware, such as in accordance with the communication process 248, which may include computer executable instructions executed by the processor 220 (or independent processor of interfaces 210) to perform functions relating to the techniques described herein, potentially in conjunction with routing process 244.

Specifically, according to various embodiments, a networking device receives packets of a traffic flow destined for a mobile system. The networking device sends a first flowlet of the traffic flow towards the mobile system via a first wireless access point. The networking device determines an idle time between the first flowlet and a second flowlet of the traffic flow. The networking device sends, based on the idle time, the second flowlet towards the mobile system via a second wireless access point.

Figure 4A:
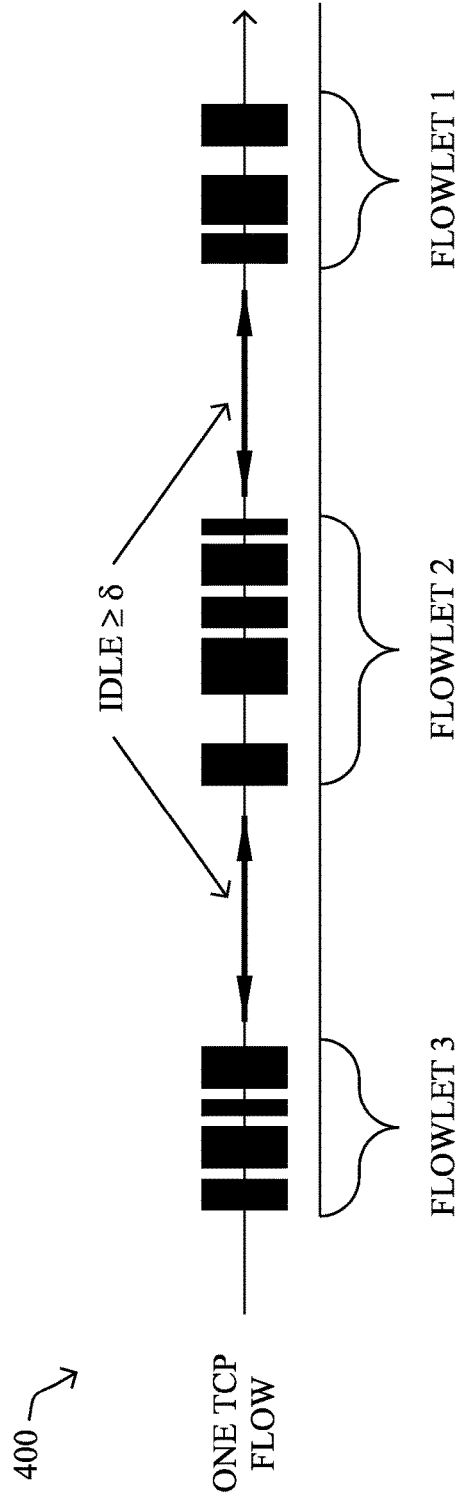
FIGS. 4A-4C illustrate examples of flowlets and their timing.

Operationally, certain aspects of the techniques herein make use of the fact that packets in a traffic flow are often spaced unequally, from a temporal standpoint. For instance, FIG. 4A illustrates an example stream of packets of a TCP flow. As shown, different sets of packets may arrive at a networking device (e.g., a gateway, controller, etc.) with varying amounts of time between them. Here, we define a flowlet as a set of frames/packets that are separated by an idle time (e.g., a time during which the device does not receive any packets of the flow) greater than or equal to some defined threshold ($\delta$). Thus, there is at least a minimum amount of delay time separating different flowlets of the flow.

Figure 4B:
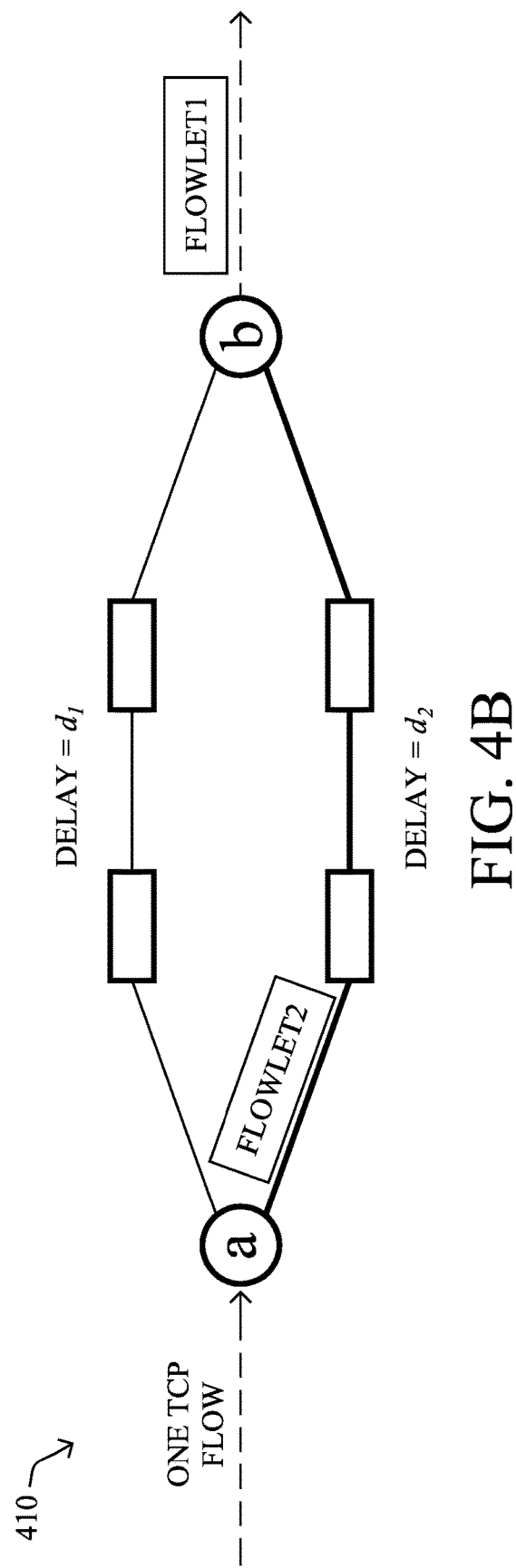

FIG. 4B illustrates an example 410 of the different paths available between a gateway or other networking device and a mobile system in a wireless network. Under the make-before-break model, there may be at least two different paths available during a wireless handoff between points a and b (e.g., a gateway and the mobile system), each path traversing a different base station/access point. As would be appreciated, the amount of delay along each of these paths may differ, with one path having a delay of $d_1$ and another having a delay of $d_2$.

Figure 4C:
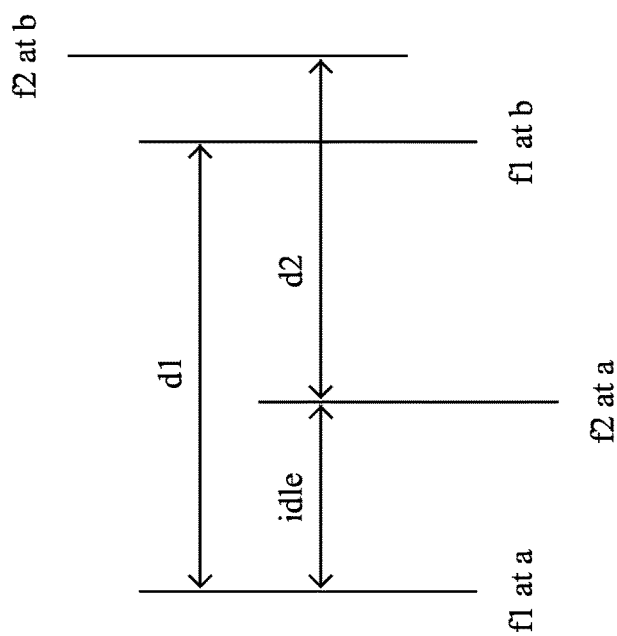

According to various embodiments, as shown in example 420 in FIG. 4C, the network may mitigate against the packet misordering scenario shown previously in FIG. 3B by taking advantage of the idle times found between flowlets of a packet flow. More specifically, assume that d1 is the path delay for flowlet f1 to arrive at point b from point a in the network. Even though there may be a different path delay $d_2$ along the second path, if the idle time between flowlet f1 and flowlet f2 exceeds this difference, this ensures that flowlet f2 sent via the second path will arrive after flowlet f1 send via the old path.

Figure 5A:
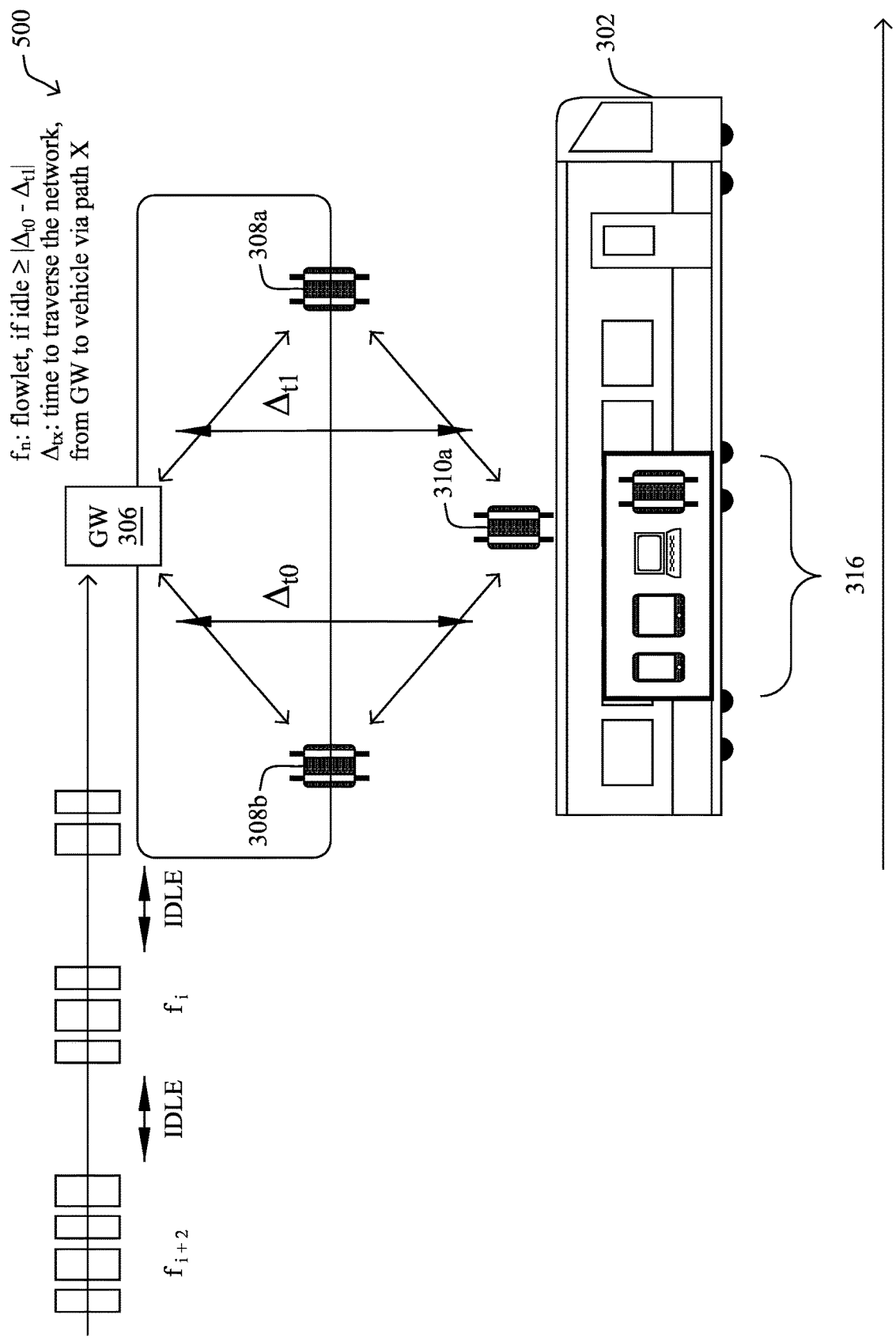
FIGS. 5A-5B illustrate an example of a wireless handoff based on flowlet idle times.
Figure 5B:
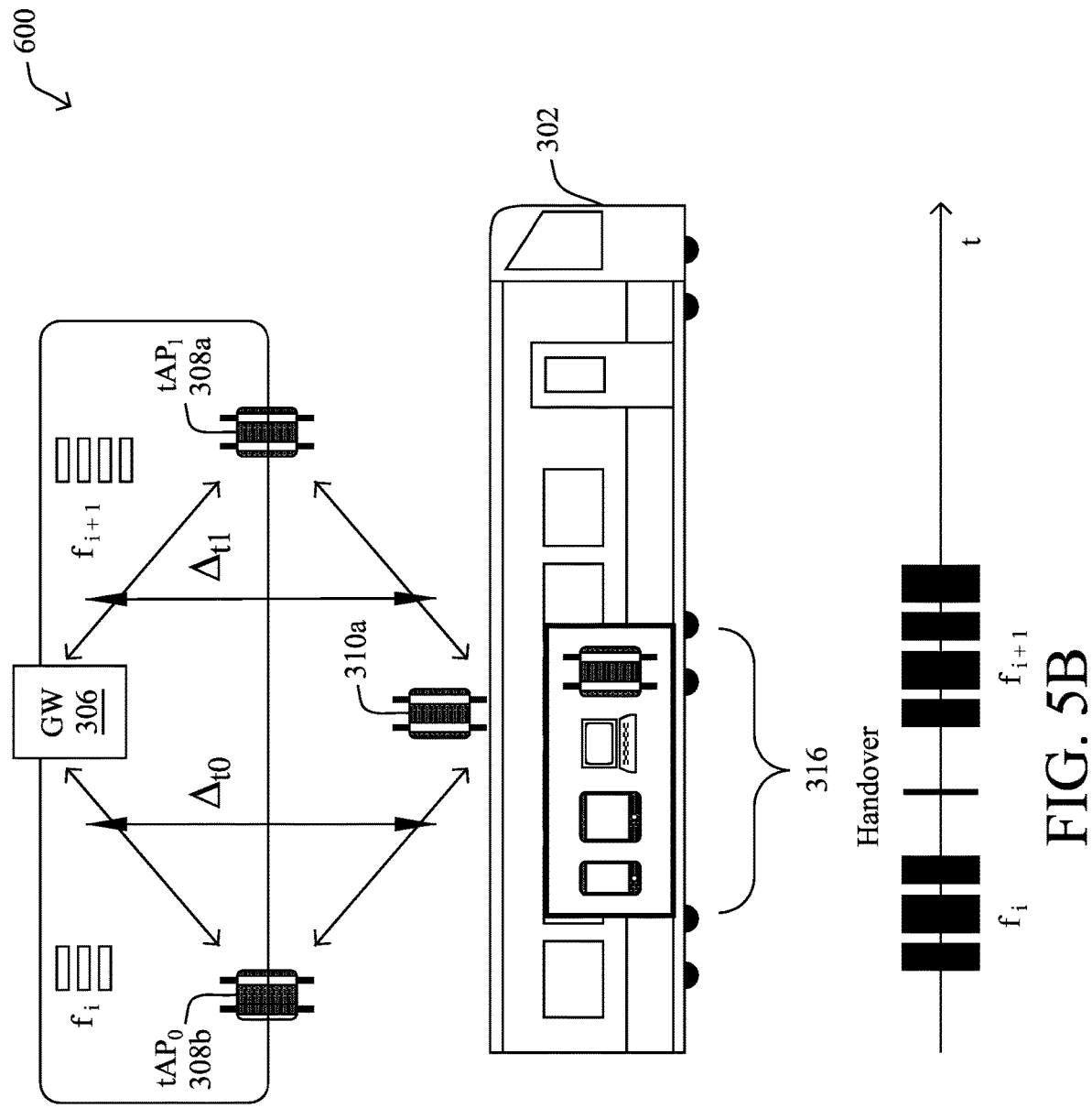

FIGS. 5A-5B illustrate an example of a wireless handoff based on flowlet idle times, according to various embodiments. In example 500 in FIG. 5A, consider again the case of mobile system 302 transitioning from using base station 308b to using base station 308a, as it travels. This means that there are two potential paths between GW 306 and MN 310a on mobile system 302: a first path that extends via base station 308b and a second path that extends via base station 308a. Let $\Delta t_x$ be the amount of time to traverse the network from GW 306 to mobile system 302 via a path x. Thus, each of the path shown has a corresponding path delay, with $\Delta t_0$ being the path delay for the first path and $\Delta t_1$ being the path delay for the second path.

If the idle time between flowlets arriving at GW 306 is greater than, or equal to, the difference between the path delays, this guarantees that a flowlet sent via the first path will arrive at mobile system 302 before a flowlet sent via the second path to mobile system 302. Thus, in various embodiments, as shown in FIG. 5B, GW 306 may send flowlet $f_i$ towards mobile system 302 via base station 308b and the subsequent flowlet $f_{i+1}$ towards mobile system 302 via base station 308a. Since the idle time is greater than the difference in the path delays, this all but guarantees that mobile system 302 will receive flowlet $f_i$ before flowlet $f_{i+1}$, thereby ensuring that the packets are received by mobile system 302 in order.

Figure 6:
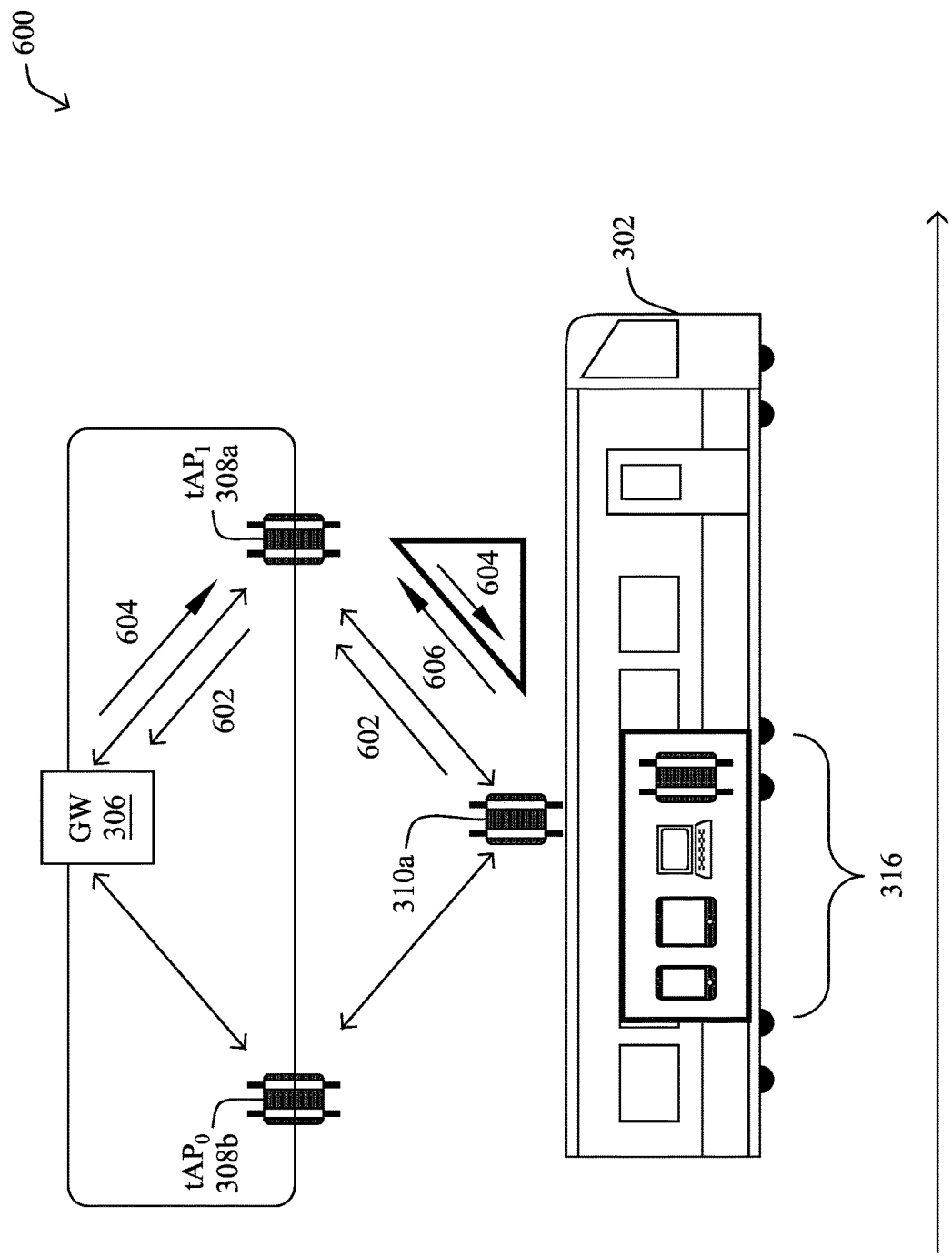
FIG. 6 illustrates an example of using queuing to ensure that packets are delivered in order.

In further embodiments, as shown in example 600 in FIG. 6, another potential mechanism to ensure that the packets are received in order is to verify that all packets have been delivered via the old path, prior to delivering the new packets via the new path. More specifically, assume again that GW 306 sends some packets to mobile system 302 via the first path that includes base station 308b.

In various embodiments, MN 310a may send a notification 602 to base station 308a indicating its intent to roam to it. In turn, base station 308a may forward notification 602 onward to GW 306. In various embodiments, once GW 306 has received notification 602, it may perform either or both of the following functions:

1. Indicate the end of the packets being sent to mobile system 302 via the old path that comprises base station 308b. This can be achieved, for instance, by GW 306 marking the last packet of the traffic sent via the old path or sending a dedicated frame to base station 308b that is forwarded onward.

2. Begin sending any subsequent packets 604 destined for mobile system 302 via the new path that comprises base station 308a.

In various embodiments, base station 308a may queue packets 604 up for delivery to mobile system 302 until it receives notification from mobile system 302 that it is ready to start receiving them. To this end, once mobile system 302 has been notified that it has received the last of the packets from the original path comprising base station 308b, mobile system 302 may send an indication 606 of this to base station 308a. In turn, base station 308a may begin sending the queued packets 604 onward to mobile system 302.

Figure 7:
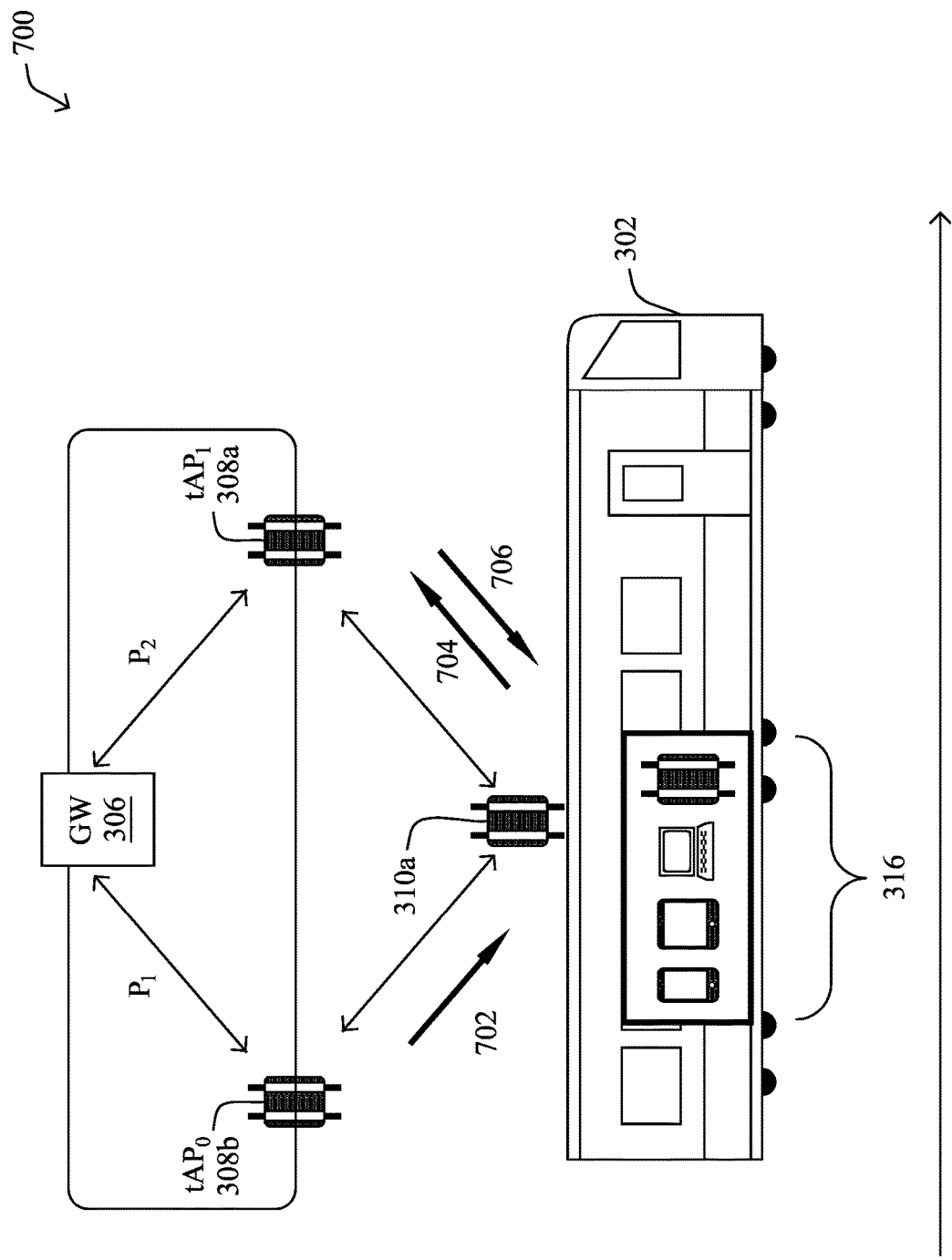
FIG. 7 illustrates an example of media access control (MAC) adaptation to ensure that packets are delivered in order.

FIG. 7 illustrates an example of media access control (MAC) adaptation to ensure that packets are delivered in order, according to various embodiments. In further embodiments, another potential mechanism to prevent packet misorderings during a wireless handoff is to vary the operational states of base station 308a and base station 308b during the process.

In response to initiation of the handoff, base station 308b may first move to a pure transmit (TX) mode of operation, in some embodiments. In this mode, base station 308b may only transmit any remaining packets sent via the first path to mobile system 302, but not forward any packets that mobile system 302 may send in the meantime. In one embodiment, packets sent via the first path may also be given an increased priority, so as to assure their swift delivery to mobile system 302.

Also during the handoff process, base station 308a may move to a corresponding receive (RX) mode of operation. Thus, any packets 704 send by mobile system 302 may be received and forwarded by base station 308a to GW 306.

Similar to the example in FIG. 7, GW 306 may indicate the end of the packets that it sends towards mobile system 302 via the original path P1. In turn, GW 306 may also begin sending any subsequent packets to base station 308a along path P2. Once mobile system 302 has received the indication 702 of the end of the packet flow on P1, it may send a notification 704 to base station 308a, indicating that it is now ready to begin receiving packets from it.

Once base station 308a has been notified that it is clear to begin transmitting packets, it may move to an RX+TX mode of operation and send the packets 706 onward to mobile system 302. In doing so, mobile system 302 will receive packets 706 after any of the packets sent via path P1, thereby ensuring correct ordering.

In some embodiments, the MAC adaptation approach above can be achieved through proper scheduling of the traffic. For instance, MN 310a, base station 308a, and base station 308b may have allocated timeslices during which they can transmit (e.g., via time synchronization, token passing, etc.).

In another embodiment, base station 308a and base station 308b may communicate on different channels. Beamforming can also be used, to direct the transmissions between mobile system 302 and the infrastructure. In a more complex embodiment, base station 308b may report the status of its queue (e.g., 50%, 25%, 10%, etc.). This can be used, for instance, to adapt the time allocated to mobile system 302 in the communication schedule.

As would be appreciated, the above techniques are not mutually exclusive and further embodiments provide for the techniques to be used in conjunction with one another. For instance. (AV 306 could mark the last frame of a fiowlet sent to base station 308h and send any subsequent flowlets to base station 308a for queueing, allowing mobile system 302 to signal when it is ready to start receiving traffic from base station 308a. In another example, base station 308a could move to a transmit only mode of operation and base station 308b could move to a receive only mode, with the use of flowlets and/or in conjunction with the queuing approach described with respect to FIG. 6.

Figure 8:
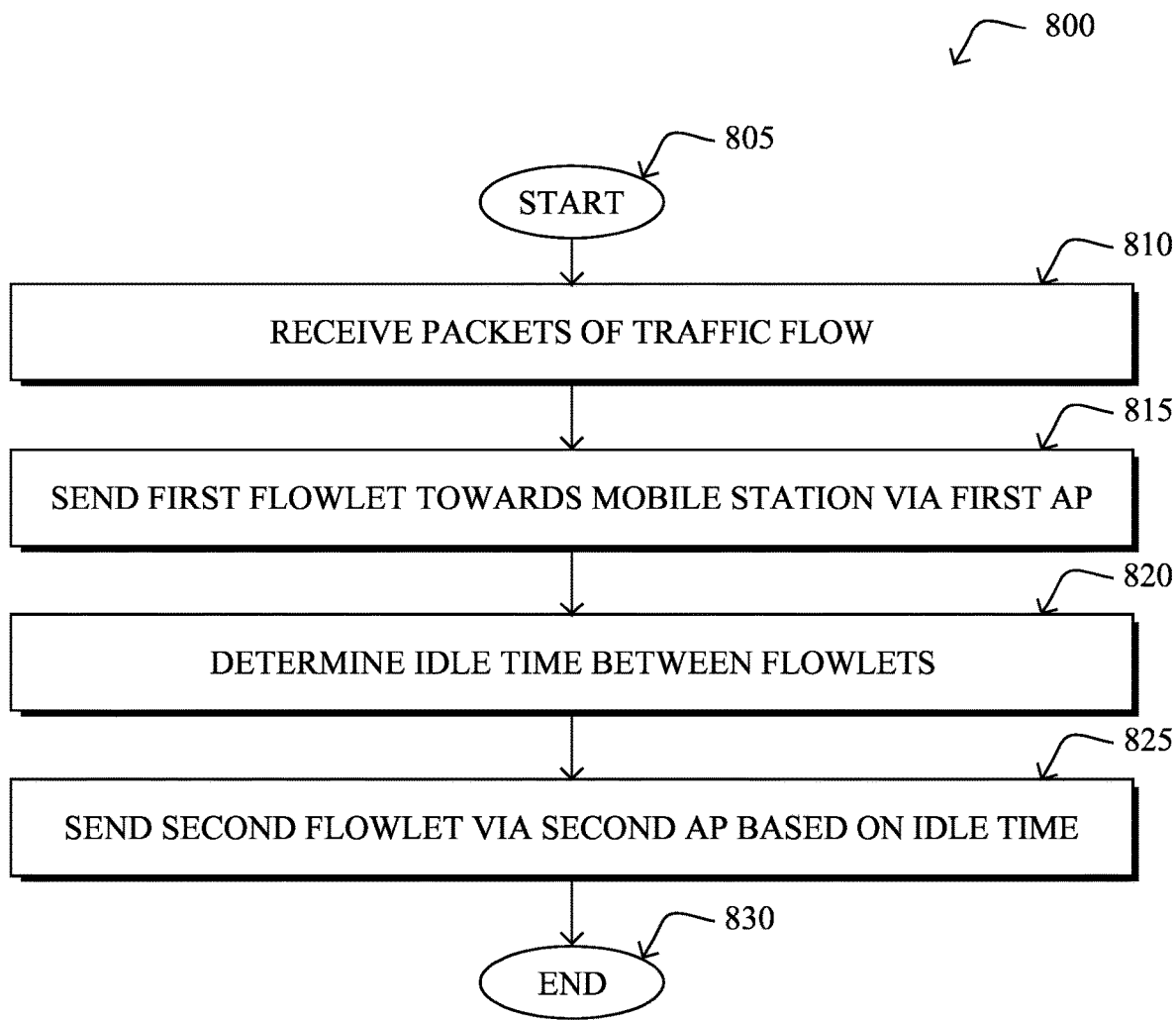
FIG. 8 illustrates an example simplified procedure for reducing packet misorderings in a wireless network.

FIG. 8 illustrates an example simplified procedure for sending packets to a mobile system, in accordance with one or more embodiments described herein. For example, a non-generic, specifically configured networking device/apparatus (e.g., device 200), such as a network gateway, AP controller, or the like, may perform procedure 800 by executing stored instructions (e.g., communication process 248). Procedure 800 may start at step 805 and continues on to step 810 where, as described in greater detail above, the device may receive packets of a traffic flow destined for a mobile system. For instance, such a mobile system may comprise a vehicle, robot, mine cart, amusement park ride, or the like.

At step 815, as detailed above, the device may send a first flowlet of the traffic flow towards the mobile system via a first wireless access point. In some embodiments, the device may do so over an MPLS tunnel. In further embodiments, the first wireless access point may be a trackside, roadside, or other access point located along a path of travel of the mobile system.

At step 820, the device may determine an idle time between the first flowlet and a second flowlet of the traffic flow, as described in greater detail above. Typically, the device may do so by measuring the amount of time between when it received the last packet of the first flowlet and when it received the first packet of the second flowlet. In various embodiments, the device may require at least a threshold amount of idle time before distinguishing flowlets. In further embodiments, the idle time is greater than a difference in transmission times between the networking device and the mobile system via the first wireless access point and between the networking device and the mobile system via the second wireless access point.

At step 825, as detailed above, the device may send, based on the idle time, the second flowlet towards the mobile system via the second wireless access point. Indeed, if the idle time is greater than the difference in transmission times between the two available paths (e.g., via either of the two access points), this will afford the second flowlet enough time to arrive at the mobile system after that of the first flowlet, thereby eliminating the potential for misordering. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, are able to prevent packets from arriving at a mobile system out-of-order, when a handoff takes place from one wireless access point to another in the network. In doing so, the mobile system does not have to wait to reorder the received packets before delivering them to their corresponding device(s).

While there have been shown and described illustrative embodiments that provide for reducing or eliminating packet misorderings during wireless handoffs, it is to be understood that various other adaptations and modifications may be made within the spirit and scope of the embodiments herein. For example, while certain embodiments are described herein with respect to using certain wired and/or wireless protocols, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
receiving, at a networking device, packets of a traffic flow destined for a mobile system;
sending, by the networking device, a first flowlet of the traffic flow towards the mobile system via a first wireless access point;
determining, by the networking device, an idle time between the first flowlet and a second flowlet of the traffic flow; and
sending, by the networking device and based on the idle time, the second flowlet towards the mobile system via a second wireless access point,
wherein the idle time is greater than a difference in transmission times between the networking device and the mobile system via the first wireless access point and between the networking device and the mobile system via the second wireless access point.

2. The method as in claim 1, wherein the mobile system comprises a mobile vehicle.

3. The method as in claim 1, wherein the networking device sends the second flowlet towards the mobile system via the second wireless access point over a Multiprotocol Label Switching (MPLS) tunnel.

4. The method as in claim 1, further comprising:
receiving, at the networking device, a roaming indication from the mobile system that the mobile system is going to roam from the first wireless access point to the second wireless access point.

5. The method as in claim 4, wherein the networking device sends the second flowlet towards the mobile system via the second wireless access point based further in part on the roaming indication.

6. The method as in claim 1, wherein sending the first flowlet of the traffic flow towards the mobile system via the first wireless access point comprises:
sending an indication to the mobile system that indicates an end of the first flowlet.

7. The method as in claim 6, wherein second wireless access point queues the second flowlet for transmission to the mobile system, and wherein the mobile system causes the second wireless access point to begin transmitting the second flowlet, in response to receiving the indication.

8. The method as in claim 6, wherein the second wireless access point moves from a receive-only mode of operation to a transceiver mode of operation, in response to receiving a notification that the mobile system received the end of the first flowlet.

9. The method as in claim 1, wherein the networking device comprises a gateway or access point controller.

10. An apparatus, comprising:
one or more network interfaces;
a processor coupled to the one or more network interfaces and configured to execute one or more processes; and
a memory configured to store a process that is executable by the processor, the process when executed configured to:
obtain location data indicative of a location of a mobile system relative to a base station of a wireless network;
receive packets of a traffic flow destined for a mobile system;
send a first flowlet of the traffic flow towards the mobile system via a first wireless access point;
determine an idle time between the first flowlet and a second flowlet of the traffic flow; and
send, based on the idle time, the second flowlet towards the mobile system via a second wireless access point,
wherein the idle time is greater than a difference in transmission times between the apparatus and the mobile system via the first wireless access point and between the apparatus and the mobile system via the second wireless access point.

11. The apparatus as in claim 10, wherein the mobile system comprises a mobile vehicle.

12. The apparatus as in claim 10, wherein the apparatus sends the second flowlet towards the mobile system via the second wireless access point over a Multiprotocol Label Switching (MPLS) tunnel.

13. The apparatus as in claim 10, wherein the process when executed is further configured to:
receive a roaming indication from the mobile system that the mobile system is going to roam from the first wireless access point to the second wireless access point.

14. The apparatus as in claim 13, wherein the apparatus sends the second flowlet towards the mobile system via the second wireless access point based further in part on the roaming indication.

15. The apparatus as in claim 10, wherein the apparatus sends the first flowlet of the traffic flow towards the mobile system via the first wireless access point by:
sending an indication to the mobile system that indicates an end of the first flowlet.

16. The apparatus as in claim 15, wherein second wireless access point queues the second flowlet for transmission to the mobile system, and wherein the mobile system causes the second wireless access point to begin transmitting the second flowlet, in response to receiving the indication.

17. The apparatus as in claim 15, wherein the second wireless access point moves from a receive-only mode of operation to a transceiver mode of operation, in response to receiving a notification that the mobile system received the end of the first flowlet.

18. A tangible, non-transitory, computer-readable medium storing program instructions that cause a device to execute a process comprising:
receiving, at the device, packets of a traffic flow destined for a mobile system;
sending, by the device, a first flowlet of the traffic flow towards the mobile system via a first wireless access point;
determining, by the device, an idle time between the first flowlet and a second flowlet of the traffic flow; and sending, by the device and based on the idle time, the second flowlet towards the mobile system via a second wireless access point, wherein the idle time is greater than a difference in transmission times between the apparatus and the mobile system via the first wireless access point and between the apparatus and the mobile system via the second wireless access point.

\* \* \* \* \*

UNITED STATES PATENT AND TRADEMARK OFFICE
CERTIFICATE OF CORRECTION

| | |
|---|---|
| PATENT NO. | : 11,575,612 B2 |
| APPLICATION NO. | : 17/340606 |
| DATED | : February 7, 2023 |
| INVENTOR(S) | : Alessandro Erta |

It is certified that error appears in the above-identified patent and that said Letters Patent is hereby corrected as shown below:

In the Specification

Column 10, Line 18, please amend as shown:
network. Even though there may be a different path delay d2

Column 11, Line 64, please amend as shown:
instance, GW 306 could mark the last frame of a flowlet sent Column 11, Line 65, please amend as shown:
to base station 308b and send any subsequent flowlets to Signed and Sealed this
Eleventh Day of April, 2023

Katherine Kelly Vidal
*Director of the United States Patent and Trademark Office*